(12) United States Patent
Zammit et al.

(10) Patent No.: US 6,817,012 B1
(45) Date of Patent: Nov. 9, 2004

(54) METHOD OF TRANSLATING A SOURCE OPERATION TO A TARGET OPERATION, COMPUTER PROGRAM, STORAGE MEDIUM, COMPUTER AND TRANSLATION

(75) Inventors: Vincent Zammit, Oxford (GB); Andrew Kay, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 499 days.

(21) Appl. No.: 09/676,916

(22) Filed: Oct. 2, 2000

(30) Foreign Application Priority Data

Oct. 5, 1999 (GB) .............................................. 9923379

(51) Int. Cl.[7] .............................. G06F 9/45; G06F 9/30; G06F 9/00
(52) U.S. Cl. ....................... 717/136; 712/200; 712/204; 712/210; 712/221
(58) Field of Search ................................ 712/200, 204, 712/210, 221; 703/27; 717/136

(56) References Cited

U.S. PATENT DOCUMENTS

| | | | | |
|---|---|---|---|---|
| 5,440,702 A | * | 8/1995 | Brewer et al. .............. | 712/223 |
| 5,568,630 A | * | 10/1996 | Killian et al. ............... | 712/200 |
| 5,694,605 A | * | 12/1997 | Miyaji et al. ............... | 717/153 |
| 5,809,306 A | * | 9/1998 | Suzuki et al. ............... | 717/143 |
| 6,075,942 A | * | 6/2000 | Cartwright, Jr. ............ | 717/138 |
| 6,496,922 B1 | * | 12/2002 | Borrill ........................ | 712/210 |

* cited by examiner

Primary Examiner—Todd Ingberg
Assistant Examiner—Qamrun Nahar
(74) Attorney, Agent, or Firm—Renner, Otto, Boisselle & Sklar LLP (57) ABSTRACT

A method is provided for translating a source operation to a target operation. The source operation acts on one or more source operands, each comprising a binary integer of a first bit-width. The target operation is required to be evaluated by a processor, such as a computer, which performs integer operations on binary integers of a second bit-width which is greater than first bit-width. The source operation is translated to a target operation having at least one target operand. The method identifies whether the value of unused bits of the or each target operand affects the value of the target operation and whether the target operand or any of the target operands is capable of having one or more unused bits of inappropriate value. If so, a correcting operation is added to the target operation for correcting the value of each of the bits of inappropriate value before performing the target operation.

13 Claims, 7 Drawing Sheets

METHOD OF TRANSLATING A SOURCE OPERATION TO A TARGET OPERATION, COMPUTER PROGRAM, STORAGE MEDIUM, COMPUTER AND TRANSLATION

BACKGROUND OF THE INVENTION

1. Field of the Invention

The present invention relates to a method of translating a source operation to a target operation. For example, the method may be used to permit efficient computation with integer values whose bit-width is not a multiple of a native integer bit-width of a target machine, such as a computer. Another application of such a method to in the simulation of high-level hardware description languages. The invention also relates to a computer program for performing such a method, a storage medium containing such a program, a computer programmed by such a program and a translation produced by such a method.

2. Description of the Related Art

Hardware description languages such as VHDL (IEEE Computer Society. *IEEE Standard VHDL Lanquage Refrence Manual.* New York, USA. June 1994. IEEE Std 1076 1993 and Verilog HDL (IEEE Computer Society. *IEEE Standard Hardware Description Language Based on the Verilog Hardware Description Language.* New York, USA. 1996. IEEE Std 1364 1995.) can be used to describe the behaviour of hardware circuits. These languages support the description of circuits involving integer arithmetic by supplying appropriate numeric types and operators. In order to design hardware efficiently, the numeric types are usually parameterised by the bit-widths of the integer values of the type.

For instance, the IEEE 1076.3 NUMERIC_STD VHDL library (IEEE Computer Society. IEEE Standard Hardware Description Language Based on the Verilog Hardware Description language, New York, USA, 1996. IEEE Std 1364 1995) defines the UNSIGNED and SIGNED integer types based on the type of bit vectors STD_LOGIC VECTOR. Bit vectors are fixed-length lists of bit values which include the values 0 and 1 as well as other states such as U (uninitialised) and Z (high impedance). Although the length of the bit vectors (and therefore of the numeric types) is fixed, one can use several types of bit vectors (each having different lengths) in a hardware design. Note that since the individual bits of a VHDL numeric type can have values other than 0 and 1, a numeric type contains several values that do not correspond to valid integers.

High-level hardware description languages, such as the Bach language (Akihisa Yamada, Koichi Nishida, Ryoji Sakurai, Andrew Kay, Toshio Nomura and Takashi Kambe. Hardware synthesis with the BACH system. International Symposium on Circuits and Systems, 1999, GB2 317 245), can be used to describe hardware at a level of abstraction usually used in programming languages such as C (Brian W. Kernihan and Dennis M. Ritchie. The C Programming Language, Prentice-Hall, USA, second edition, 1988).

Since the C language, and programming languages in general, are designed to be used to program some particular architecture, the semantics of their integer types and expressions usually depend on the target architecture being programmed. For example, the C language (Brian W. Kernihan and Dennis M. Ritchie. The C Programming Language, Prentice-Hall, USA, second edition, 1988) supplies the int and unsigned int types which correspond to signed and unsigned integers whose bit-width is naturally supported by the target machine. The C integer types are too inflexible to be used for the efficient design of hardware and therefore the Bach hardware description language extends C by exact width integer types, such as intw and unsigned into for signed and unsigned v-bit integers, respectively.

One of the many advantages of using a high-level, programming-language based, hardware description language like Bach over using a lower level one such as VHDL is the ability to simulate (on a general purpose architecture) the behaviour of designs at much higher speeds. For example, because of the particular level of abstraction of the VHDL numeric types described earlier, one cannot use the integer arithmetic of the target machine used for simulation directly. In general, one would have to represent every bit value of a numeric type as a separate byte/word on the target machine and therefore the simulation of VHDL arithmetic operations can be much slower than the native arithmetic of the target machine. Although Bach arithmetic is more similar to the native arithmetic of a target machine than VHDL numeric arithmetic is, one still cannot use the native target machine arithmetic naively because of the difference in the bit-widths. One therefore needs to develop methods for the correct and efficient simulation of the exact width of the arithmetic usually used in hardware descriptions.

Retargetable compilers, such as the Valen-C compiler (Graduate School of Information Science and Electrical Engineering (Kyushu University), Advanced Software Technology and Mechatronics Research Institute of Kyoto, Institute of Systems and Information Technologies (Kyushu) and Mitsubishi Electric Corporation. *Valen-C Compiler Development Ddocument (English Version* 1.01). Information Technology promotion Agency, Japan, April 1998), can be used to compile an input source program to the assembly/machine language of different target machines. The input language of the Valen-C compiler is the Valen-C programming language which also extends the ANSI C language by exact width integer types. The programmer can specify integer types of the form intw where w is any non-zero natural number representing the width of the type. However, the semantics of the Valen-C integer arithmetic is still dependent on the target architecture and an integer type intw is actually defined as being at least w bits long and Its width is a multiple of the word size of the target machine. As a result, the behaviour of the compiled code differs from one target machine to another.

De Coster et al, "Code generation for compiled bit-time simulation of DSP applications", 11th International Symposium on System Synthesis (ISSS'98) 2–4 Dec. 1998, Hsinch, Taiwan (IEEE Computer Society Publications) pp 9–14 disclose a method intended for translating, fixed point integer arithmetic into standard integer arithmetic for the efficient simulation of digital signal processing (DSP) applications. However, no attempt is made to minimise value correcting operations in the resulting integer arithmetic expressions, which thus make inefficient use of target machine resources.

EP 0 626 640 and EP 0 626 641 disclose techniques for converting high level processing languages into machine language. These techniques require the intervention of a user to assess whether the value of an operation is likely to overflow when a program is executed by a computer. If so, a value correction operation is performed and may comprise a masking operation or a sign-extending operation depending on whether the operation is unsigned or signed.

SUMMARY OF THE INVENTION

According to a first aspect of the invention, there is provided a method of translating a source operation on at least one source operand comprising a binary integer of a first bit-width to a corresponding target operation for evaluation by a processor which performs integer operations on binary integers of a second bit-width which is greater than the first bit-width, the method comprising: translating the source operation to a target operation having at least one target operand; identifying whether the value of unused bits of the or each target operand affects the value of the target operation and whether the target operand or any of the target operands is capable of having one or more unused bits of inappropriate value; and, if so, adding to the target operation a correcting operation for correcting the value of each of the one or more bits of inappropriate value before performing the target operation.

The at least one source operand may comprise at least one constant.

The at least one source operand may comprise at least one variable.

The at least one source operand may comprise at least one sub-operation.

The source operation may comprise an arithmetic operation. The identifying step may comprise identifying an unsigned unmasked target operand and the correcting step may comprise a masking step. The first bit-width may be w bits and the masking step may comprise performing a bit-wise AND operation between the unsigned unmasked target operand and a binary representation of $(2^w-1)$. The identifying step may comprise identifying a signed non-sign-extended target operand and the correcting step may comprise a sign-extending step.

The source operation may comprise a relational operation and the correcting step may comprise a monotonic operation.

According to a second aspect of the invention, there is provided a computer program for performing a method according to the first aspect of the invention.

According to as third aspect of the invention, there is provided a storage medium containing a computer program according to the second aspect of the invention.

According to a fourth aspect of the invention, there is provided a computer programmed by a program according to the second aspect of the invention.

According to a fifth aspect of the invention, there is provided a translation produced by a method according to a first aspect of the invention.

The term "unused bit" of a target operand refers to any bit thereof which is not used to represent the value of a corresponding source operand.

The term "inappropriate value" of an unused bit refers to a value of an unused bit which, if present in the target operand, will result in the target operation being evaluated to a value different from that of the corresponding source operation.

It is thus possible to provide a method for the efficient computation of arithmetic and relational expressions involving integers of any bit-widths using a given device which is only capable of computing integer arithmetic expressions of certain bit-widths.

For a given device or mechanism, called the target machine, which is capable of computing integer arithmetic of some specified widths, say, $W_1$, $w_2$ etc., such a method translates arithmetic expressions involving integers of any width into efficient arithmetic expressions involving integers of the specified widths. The language of expressions involving integer arithmetic of any width is referred to as the source language. Similarly, the language of expressions involving integers of the given widths $w_1$, $w_2$, etc., is referred to as the target language. Using this method:

An integer atomic expression (such as a constant or variable) having width w is represented by an atomic expression whose width is that of the narrowest target language integer that is at least w bits wide. For example, an unsigned atomic expression of width 5 is represented by an atomic expression of width 16 if the target language contains integers of width 16, 32, 48, etc.

$$20_{(U5)} \rightarrow 20_{(U16)}$$

The notation $x_{(Uw)}$ denotes the fact that the expression has an unsigned integer type of width w and $x \rightarrow y$ denotes the fact that the source expression x is translated into the target expression y.

Arithmetic operations in the target language are used whenever possible.

For example:

$$a_{(U5)} + b_{(U5)} \rightarrow a_{(U16)} + b_{(U16)}$$

Because of the different widths in the source language and target language, the values of the target operations may differ from those in the source language:

$$20_{(U5)} + 30_{(U5)} = 18_{(U5)} \text{ while } 20_{(U16)} + 30_{(16)} = 50_{(16)}$$

and therefore value correcting operations may be required in order to ensure that the value of operations in the target expression is the same as those in the source expression when this in required:

$$a_{(U5)} + b_{(U5)} \rightarrow (a_{(U16)} + b_{(U16)}) \& 31_{(U16)}$$

where & is the bitwise AND operator. The operation $X_{(U16)}$ & $31_{(U16)}$ corrects the 16 bit value stored in the expression $X_{(U16)}$ assuming that it represents a 5 bit unsigned value.

Value correcting operations are not applied to every sub-expression that is translated, but only when such operations are required. For example, the expression:

$$(a_{(U5)} + b_{(U5)}) * c_{(U5)}) / (d_{(U5)} + e_{(U5)})$$

is not naively translated into:

$$((((a_{16}) + b_{(U16)}) \& 31_{(U16)}) * c_{(U16)}) \& 31_{(U16)}) /$$

$$((d_{(U16)} + e_{(U16)}) \& 31_{(U16)} \& 31_{(U16)})$$

which uses 8 target machine operations, but into the more efficient:

$$(((a_{(U16)} + b_{(U16)}) * c_{(U16)}) \& 31_{(U16)}) / ((d_{(U16)} + e_{(U16)}) \& 31_{(U16)})$$

which uses 6 operations.

This is achieved by using an internal representation of the target expressions (stored in memory locations, or registers, on the machine used to translate source expression representations into target machine representations) which includes 1. the representation of the target machine expression;
2. together with the following additional information: the sign of the expression, the width of the original expression (called the significant width), the width of the target expression (called the representative width), and some information on the possible values of the bits in the integer value of the target expressions that are not used to store the value of the source expression (called the high-bit properties). The bits in the target expression values that are not used to store the value of the source expression are called the unused bits.

This information is called the additional type information. Of particular importance is the high-bit properties information which states whether the following two properties are satisfied:

the masked property which states that all the unused bits are 0.

the sign-extended property which states that all the unused bits are the same as the most-significant bit of the value of the source expression.

These two properties are significant because, if the expression is unsigned, then the value of the source expression is the same as the value of the target expression if and only if the target expression has the masked property.

if the expression is signed, then the value of the source expression is the same as the value of the target expression if and only if the target expression has the sign-extended property.

By using additional memory locations to store the additional type information (apart from the memory locations required to store the representation of the target machine expression), such a translation method can insert the appropriate value correcting operations in target expression only when:

1. the value of the target expression is different from that of the source expression (that is, when the expression is unsigned and does not have the masked property, or when it is signed and does not have the sign-extended property), and
2. the operation being translated requires the correct target expression values of its operands. Certain operations, such as + and * do not require the correct value for their target operands as long as the values in the significant bits are the same as the values in the bits of the source expression. As a result their operands do not need to be value-corrected when the target expression is constructed.

Other operations, such as ¥ require correct values for their operands, and therefore they have to be value corrected if their appropriate high-bit property (masked if the expression is unsigned, sign-extended otherwise) is not set. The result of certain operations (such as ¥, but not + or *) is correct and therefore the appropriate high-bit property can be set in the additional type information of the target expression so that no value correction on the resulting expression is required later.

Since value-correcting operations are not inserted naively in all operations, the resulting target expression is more efficient.

Such a method can be used when arithmetic involving integers of any bit-widths needs to be computed on a processor or any device which can efficiently compute arithmetic operations of certain bit-widths only. Industrial applications of such a method include:

The efficient simulation of high-level descriptions (using Bach, or otherwise) of arithmetic circuits on some specified target machine. Hardware is described in the Bach high-level language, and a low-level synthesizable industrial-strength hardware description is generated automatically. Since the hardware designer uses a high-level language instead of a lower level one (such as VHDL), the design process is much quicker, and therefore cheaper, than traditional hardware design processes. The present method may be used in the simulation phase of the Bach design flow, where the Bach hardware description is validated before the actual hardware is synthesised. This makes the simulation phase much faster than the use of naive methods, therefore reducing the time spent in hardware design.

The efficient simulation or compilation of arithmetic operations targeted to a machine whose native integer arithmetic is different from the one used for simulation. For example, a program targetted to a particular processor (which may be slow or not readily available during the implementation stage) can be simulated on a faster, readily available processor whose architecture is different from the target machine architecture.

The efficient simulation of the designs of embedded systems where the efficient simulation of both hardware and software is required.

Advantages which are readily achievable include:

The target expressions generated by such a method are efficient since the native integer arithmetic of the target machine is used directly and the number of value correcting operations is reduced.

The translation method itself is not time/space expensive and can therefore be used in applications where a quick compilation of the source expressions into the target expressions is required.

BRIEF DESCRIPTION OF THE DRAWINGS

The present invention will be further described, by way of example, with reference to the accompanying drawings, in which.

Like reference numerals refer to like parts throughout the drawings.

DESCRIPTION OF THE PREFERRED EMBODIMENTS

Figure 1:
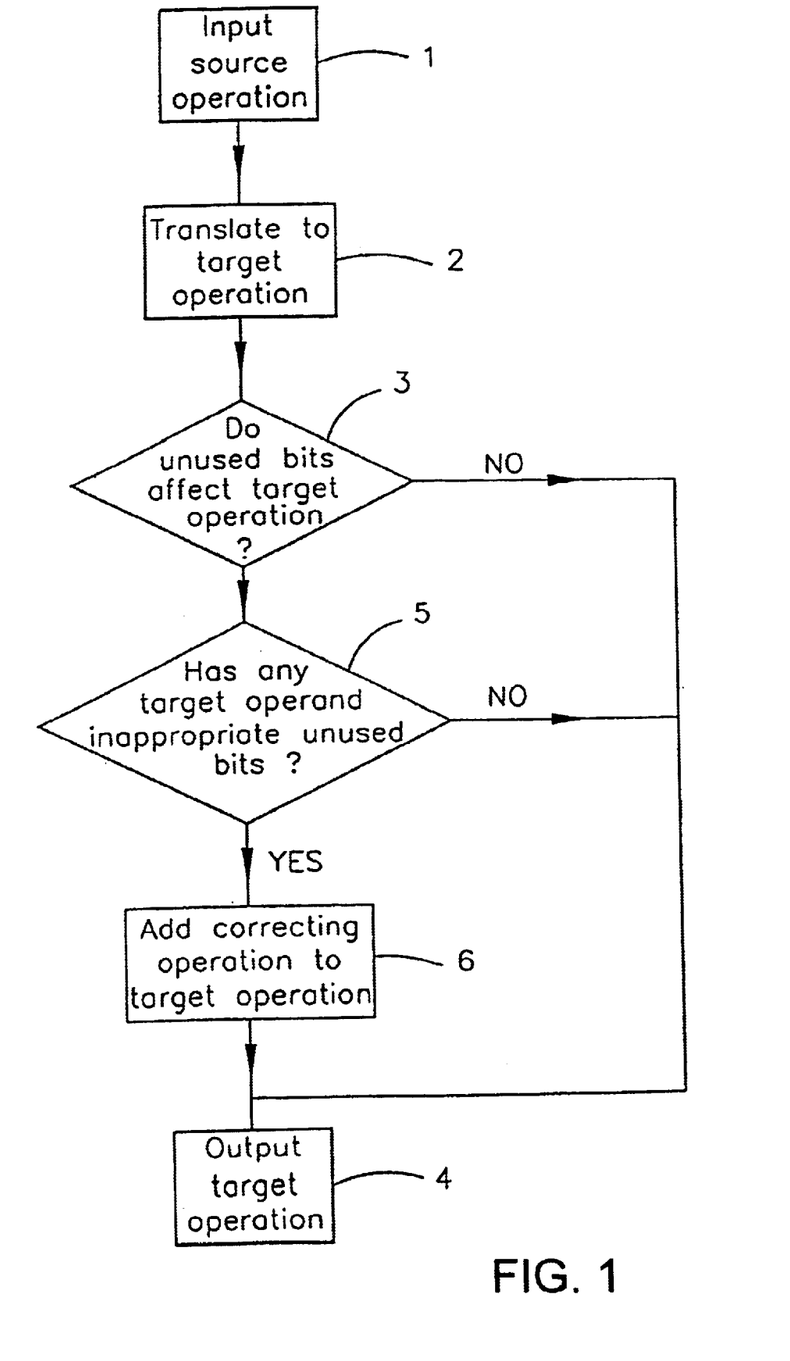
FIG. 1 is a flow diagram illustrating a translation method constituting an embodiment of the invention.

FIG. 1 illustrates a method of translating a source operation to a target operation. The source operation is performed on binary integers of a first bit-width and may comprise an arithmetic operation or a relational operation. The target operation is to be performed by a device such as a computer which performs arithmetic and/or logic operations on integers with a second bit-width which is greater than the first bit-width.

A step 1 inputs a source operation and a step 2 translates the source operation to a corresponding target operation. A step 3 detects whether any unused bits of a target operand can affect the target operation. The target operation is, in this sense, "affected" the presence of any unused bits may result in the evaluation of the target operation being different from the evaluation of the corresponding source operation. If none of the unused bits can affect the target operation, the target operation is output at a step 4 for subsequent processing by the target machine.

If the unused bits can affect the target operation, a step 5 detects whether any target operand has inappropriate unused bits. For example, it may be that the or each operand of the target operation has unused bits which are already set to values such that evaluation of the target operation will not be affected. In this case, control passes to the step 4 which outputs the target operation. However, if the or any target operand has inappropriate unused bits, a step 6 adds a correcting operation to the target operation before outputting the target operation at the step 4. It can thus be ensured that, when the target operation is performed on the target machine, the resulting evaluation will be the same as that of the source operation.

Figure 2:
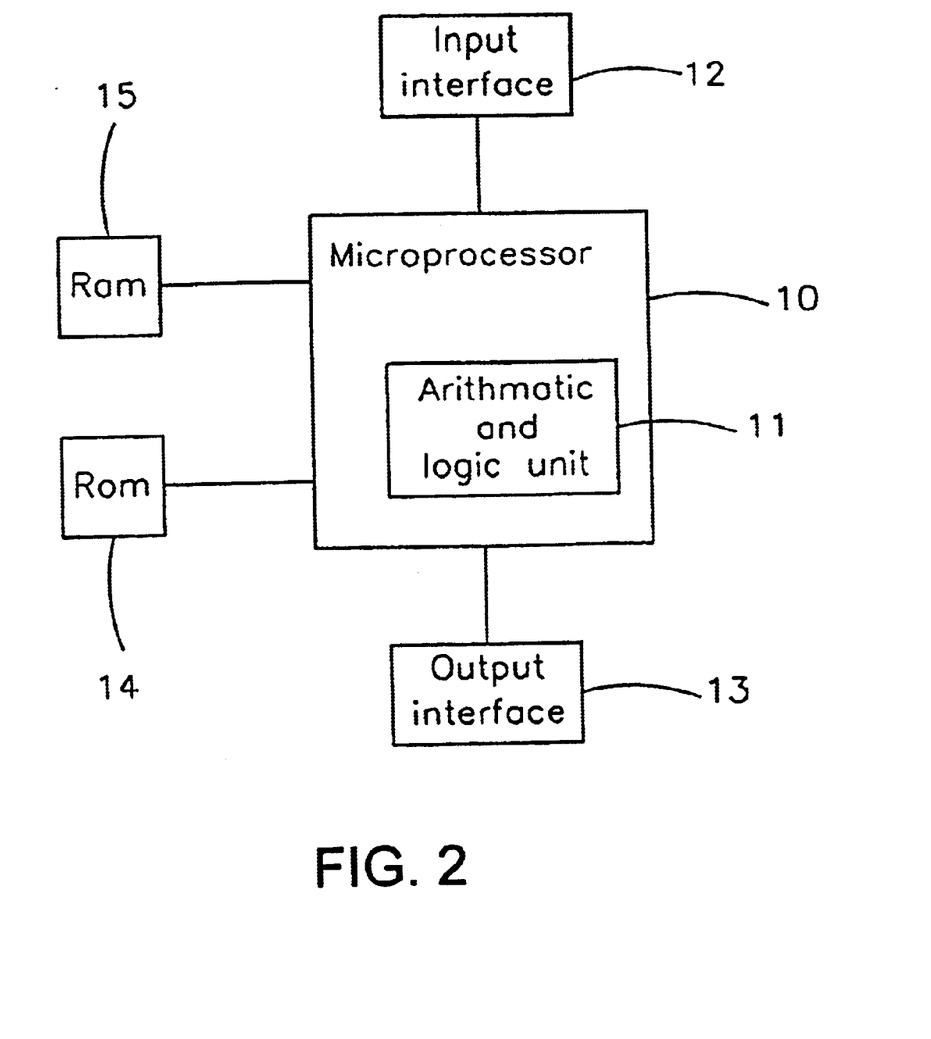
FIG. 2 in a block schematic diagram of a computer for performing the method illustrated in FIG. 1.

FIG. 2 illustrates a computer which may be used to perform the translation method illustrated in FIG. 1. The computer comprises a microprocessor 10 which includes an arithmetic and logic unit 11. The microprocessor is provided with an input interface 12 for receiving source operations for translation and an output interface 13 for supplying the resulting translations in the form of target operations. The computer has a read-only memory 14 containing a program for controlling the microprocessor 10 to perform the method illustrated in FIG. 1. The computer also has a random access memory 15 for temporarily storing values which occur during operation of the microprocessor 10.

The method illustrated in FIG. 1 is a very basic embodiment of the invention. More sophisticated methods are described herein after in greater detail. The following methods perform translations of expressions which are equivalent to the "operation" described with reference to FIG. 1.

Arithmetic expressions evaluate, or compute, values, and we consider the set of values which contains:

unsigned binary integers of any bit-width;

signed binary integers of any bit-width.

We assume the standard unsigned binary interpretation for unsigned integers, for example the unsigned binary numeral 1101 is interpreted as the integer 13; and we assume the two's complement interpretation for signed integers, for example the signed binary numeral 1101 is interpreted as the integer −3.

In order to differentiate between the different types of values expressions can evaluate to, we assume that all expressions are typed by a term of the forms unsigned$\omega$, or simply U$\omega$, for unsigned integer values; or signed$\omega$, or simply S$\omega$, for signed integer values;

where the width $\omega$ is a non-zero positive integer representing the number of bits in the value. We usually write $e_{(t)}$ to denote the fact that e has type t. The type of an expression is usually omitted when it can be inferred from the context, or when it is not relevant to the discussion.

Expressions can be:

atomic such as constants and variables, or compound which consist of an operator, op say, applied to a number of expressions $e_1, e_2 \ldots e_n$, called the operands:

op ($e_1, e_2 \ldots, e_n$)

Constants evaluate to a fixed value (hence their name), while the value of variables is given by an assignment: a mapping from variables to values of their type. The valuation of a compound expression depends on the operator and the evaluation of its operands.

The evaluation of an expression can have side-effects: that is, it can change the assignment of the variables. For example, given the initial assignment:

$x_{(S16)} \rightarrow 10_{(S16)}$ $x_{(S16)} \rightarrow 20_{(S16)}$ and assuming the C semantics for the operators =, +, * and, then the evaluation of:

$(x_{(S16)} = x_{(S16)} + 1, y_{(S16)} = x_{(S16)} * y_{(S16)})$ returns the value $220_{(S16)}$ and modifies the assignment to:

$x_{(S16)} \rightarrow 11_{(S16)}$ $y_{(S16)} = 220_{(S16)}$

The aim is to be able to compute expressions involving arithmetic sub-expressions of any bit-width using some target machine which is capable of efficiently computing arithmetic expressions involving certain bit-widths: $\omega_1$, $\omega_2$, . . . only. Existing methods (see for instance Giles Brassard and Paul Bratley. *Algorithmics:Theory and Practice*. Prentice-hall, USA, 1998) can be used to compute is arithmetic operations on the target machine efficiently on integers whose width is a multiple of one of the specified widths. Using these methods, we can assume that the given target machine can efficiently compute integer arithmetic involving an infinite number of widths:

$\omega_1, \omega_2 \ldots 2\omega_1, 2\omega_2 \ldots 3\omega_1, 3\omega_2 \ldots$ etc. We refer to these bit-widths as the native bit-widths of the target machine. We refer to the set of expressions that can be computed directly by the target machine as the target language defined more formally by the following statement: The expression e is in the target language if and only if the widths of all the sub-expressions of e are native bit-widths. We also define the source language as the set of expressions of any bit-width.

Figure 3:
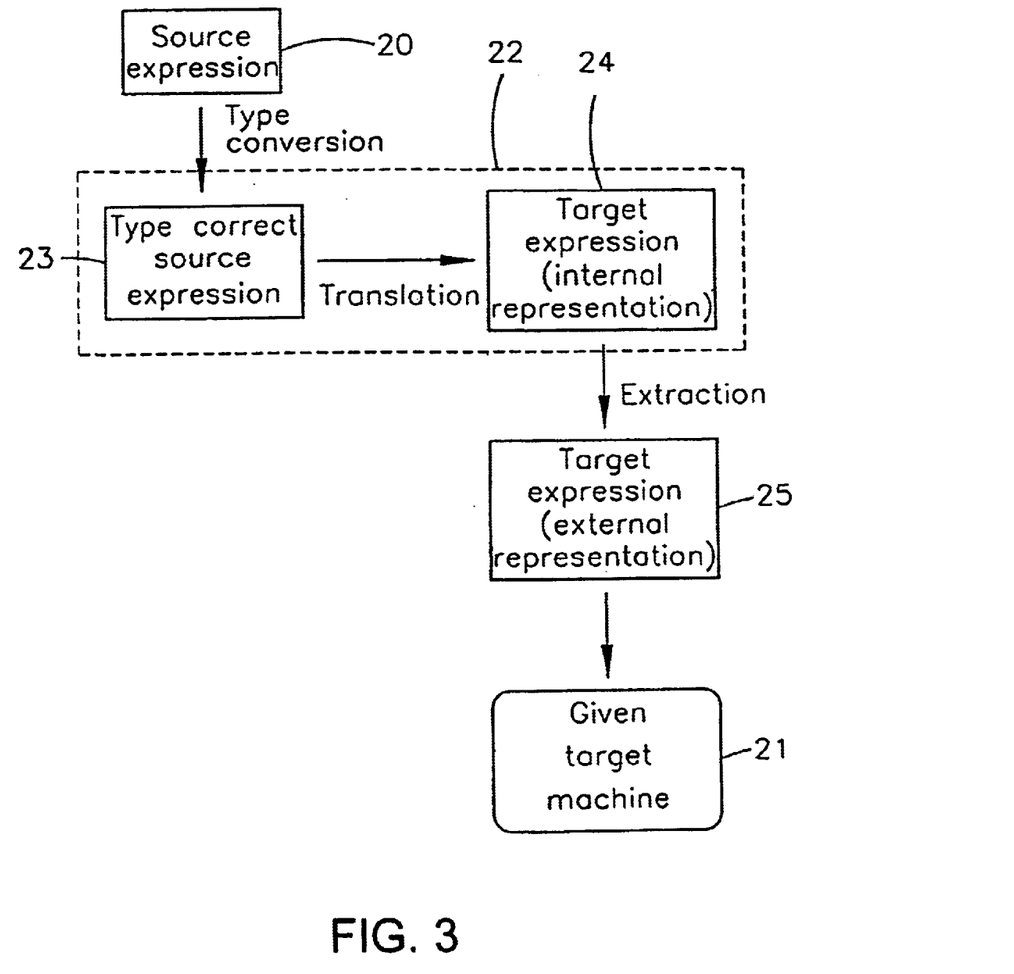
FIG. 3 is a schematic flow diagram illustrating a translation method constituting another embodiment of the invention.

FIG. 3 gives an overview of the method by which expressions 20 in the source language can be computed by the given target machine 21. The core of this method is the translation mechanism 22 which takes a type correct source expression 23 and returns an internal representation 24 of the target expression. An expression is type correct if it obeys a number of language-dependent typing rules such as, for instance, that the types of the operands of an arithmetic binary operation are the same as the type of the value returned by the operation. We can therefore assume that the source expression is first type-converted into a type correct expression. The type-conversion mechanism depends on the semantics of the source language and is not discussed here (see Appendix A6 of (Brian W. Kernighan and Dennis M. Ritchie. *The C Programming Language*. Prentice-Hall, USA. second edition. 1988) for the type-conversion mechanism of C expressions). Given a type correct source expression, the translation mechanism 22 returns an internal representation 24 of the target expression from which a target machine readable expression 25 can be extracted and computed. The mechanism for extracting the machine readable expression from the internal representation of the target expression depends on the target machine used and is not discussed here.

Figure 4:
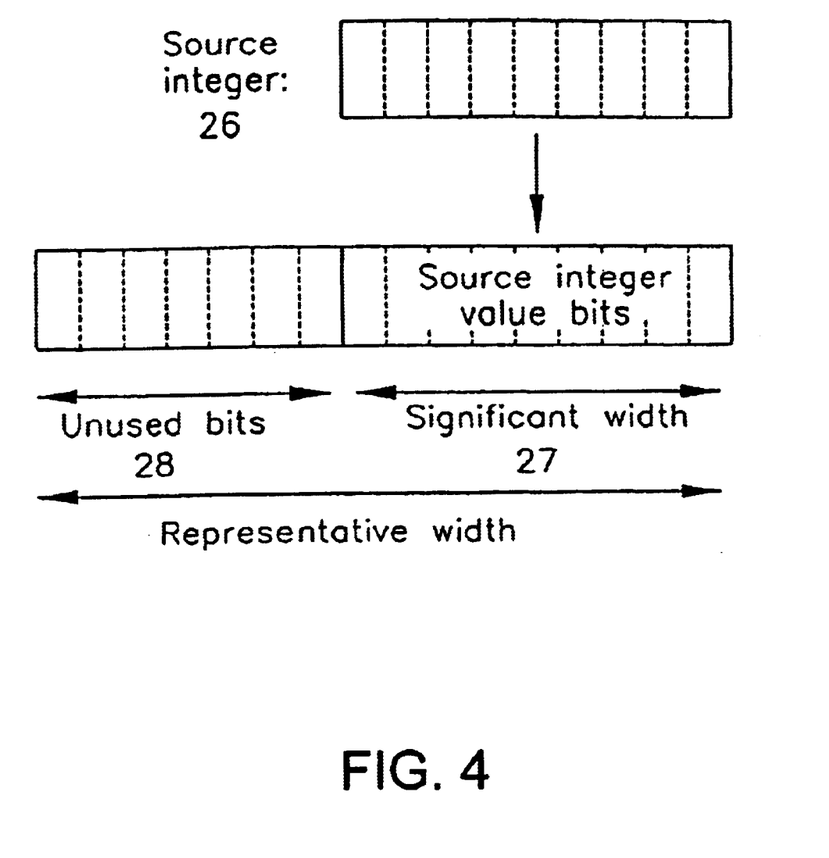
FIG. 4 is a diagram illustrating the bit structure of a source integer and of a target integer to which it is translated.

FIG. 4 illustrates how a source integer value can be represented by a target integer value. Basically, an n-bit integer to represented by an m-bit target integer of the same sign, where m is the smallest native bit-width that is greater than or equal to n. The source integer bits 26 are stored in the lowest n-bits 27 of the target integer. The highest (m-n) bits 28 in the target integer value are called the unused bits. The lowest n bits 27 of the target integer value are called the significant bit-string. In order that the interpretation of the target value is the same as that of the source value:

If the source integer value is unsigned, then the target integer value is masked: the unused bits in the target integer value are set to 0.

if the source integer value is signed, then the target integer value is sign-extended: the unused bits of the target integer value are set to the highest bit in the significant bit-string.

Figure 5:
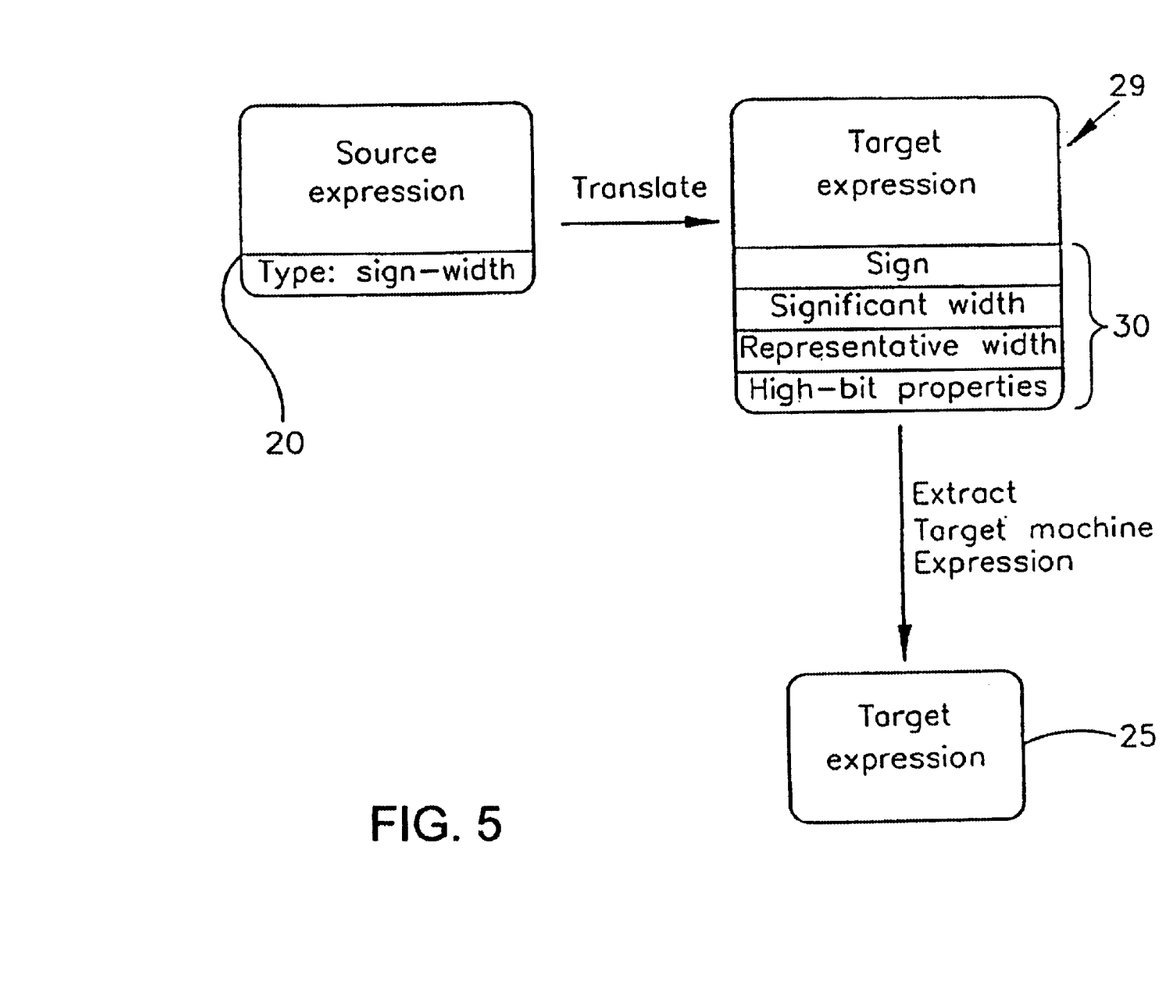
FIG. 5 is a diagram illustrating an internal data structure for representing target machine expressions used in the method shown in FIG. 3.

The internal representation of the target language expressions is illustrated in FIG. 5 and includes:

the external representation 29 of the target expression, which depends on the target machine; as well as some type information 30 which is used by the translation process in order to generate efficient target expressions.

We use the notation <i>t to denote the internal representation of the target expression t with type information i. The internal representation of the target expression should have an extraction operation which returns a target machine readable representation of the expression.

The type information 30 is a data structure which has the following functions:

sign: The sign of the expression which can be either signed or unsigned.

significant width: The significant width of a target expression is the width of the original expression it represents.

representative width: The representative width of a target expression is its actual bit-width on the target machine. The representative width of an integer expression is greater than or equal to its significant width. The type of an expression is said to be precise if its representative width is the same as its significant width. The bits in an imprecise integer representation that are higher than its significant width are called the unused bits.

high-bit values. The high-bit values, or high-bit properties of an imprecise expression give some information on its unused bits. The high-bit properties of an expression are:

masked: A target expression is given the masked property if, for every assignment, it always evaluates to a value whose unused bits are all set to 0.

sign-extended: A target expression is given the sign-extended property if, for every assignment, it always evaluates to a value whose unused bits have the same value as the highest bit in the significant bit-string.

The properties are not mutually exclusive, as shown in the following example which lists some integer values with representative width 16 and significant width 9:

| Integer Value (in bits) | | High-Bit Properties | |
|---|---|---|---|
| unused bits | significant bits | masked | sign-extended |
| 0000000 | 101011011 | yes | no |
| 1111111 | 101011011 | no | yes |
| 0010001 | 101011011 | no | no |
| 0000000 | 010101101 | yes | yes |
| 1111111 | 010101101 | no | no |

A target expression is said to be faithful if, for every assignment, it evaluates to a value whose interpretation is the same as that of its significant bit-string (assuming the same sign). Therefore, an expression is faithful if:

it is unsigned and has the masked property, or it is signed and has the sign-extended property.

It is a sometimes convenient that every sub-expression of a target expression is also annotated with the type information because:

the sign and representative width of the expression may be required by the operation which extracts a machine readable representation of the target expression;

one can develop optimisations on the internal representation of the target expressions which make use of the significant width and high-bit properties.

We can also generalise the high-bit values of the expression to give us the extent of the masking and sign-extension of the expression by using the following two values:

masking extent: A target expression e has a masking extent of n, where n is smaller than the representative width of e, if for every assignment it always evaluates to a value whose bits in position greater than or equal to n are 0.

00000001010100011 has a masking extent of 10.

11111000000101010 has a masking extent of 17.

sign-extension extent: A target expression e has a sign-extension extent of n, where n is smaller than the representative width of e and greater than 0, if for every assignment it always evaluates to a value whose bits in position greater than or equal to n are equal to bit n−1.

00000001010100011 has a sign-extension extent of 11.

11111000000101010 has a sign-extension extent of 13.

Note that we are using the convention that the least significant bit of a bit-string is in position O.

Representations of integer expressions can be made faithful by applying value correcting operations which guarantee that the values evaluated by the expression are masked or sign-extended as required. We assume that the following two operations on target expression representations can be defined:

a masking operation which takes an expression t and returns an expression t' such that, for every assignment, the significant bit-strings of t and t' are the same, and that t' has the masked property.

a sign-extending operation which takes an expression t and returns an expression t' such that, for every assignment, the significant bit-strings of t and t' are the same, and that t' has the sign-extending property.

Given an expression t, we use the notation m(t) and s(t) to represent the expression t applied to the masking operation and the sign-extending operation, respectively. We also define the 'make-faithful' operation f(t) which given an expression t returns m(t) if t is unsigned, and returns s(t) if t is signed.

We assume that the evaluation of the target expressions represented by m(t) and s(t) may be more time/space expensive than the evaluation of the target expression represented by t and that, therefore, the translation of source integer expressions into target integer expressions should try to minimise the applications of these operations, rather than applying them naively to every sub-expression that is translated.

In certain cases, the implementation of a value correcting operation can be such that the time/space cost of evaluating some particular expression is the same as the evaluation of the value corrected expression. This is certainly the case for an already value corrected expression, since the operation can simply return the original expression. It is also the case for a constant expression, since it can be value corrected by correcting the constant value directly and thus returning another constant expression (of the same cost). An expression t is easily masked if the evaluation of m(t) has the same cost as the evaluation of t. Similarly, an expression t is easily sign-extended if the evaluation of s(t) has the same cost as the evaluation of t.

When translating integer expressions involving side-effect free relational operators (such as < and <=) which return a boolean value (this is a representation for the two truth values: true and false), it may not be necessary to apply a value correcting operation to the operands. Instead, it is enough to apply a usually cheaper monotonic operation on the operands which satisfies the following properties:

$op_s(s_1, \ldots, s_n)$ computes a boolean value representing true if and only if $op_T(mn(t_1), \ldots, mn(t_n))$ computes a boolean value representing true;

$op_s(s_1, \ldots, s_n)$ computes a boolean value representing false if and only if $op_T(mn(t_1), \ldots, mn(t_n))$ computes a boolean value representing false;

where mn(t) represents the monotonic operation applied to the target expression t, $op_s$ is an n-ary relational operation in the source language, $op_T$ is the corresponding n-ary relational operation in the target language, $s_1, \ldots, s_n$ are source expressions, and $t_i, \ldots, t_n$ are their corresponding (not necessarily value corrected) target expressions.

Different relational operators may require different monotonic operations. Also, there can be several monotonic operations that are applicable to the same relational operator.

We now describe the transformation of type correct source expressions into the internal representation of the target expressions. We first describe the general mechanism for translating a source expression into a target expression, and then give a concrete illustration of this process on a set of arithmetic expressions involving several C-style operators.

The transformation of the source expressions into target expressions depends on the different operators in the source language. The method uses the following properties of the operators in the source language:

Property 1 deals with the values of the unused bits of the result of the operation. In certain operations, such as +, − and *, the unused bits of the operands do not affect the significant bits of the result and the operands of such operands are not applied to the value correcting operations when the source expressions are translated into target expressions. If the unused bits of an operand can affect the significant bits of the result, then this particular operand needs to be value corrected, or, in the case of relational operations, all operands need to be applied to is a valid monotonic operation.

Property 2 deals with the way the unused bits and significant bits of the operands affect the unused bits of the result of the operation. In certain operations, such as ¥ and %, the value of the result is guaranteed to be faithful, and therefore the appropriate high-bit property can be set in the type information of the target expression.

Basically, the method described here:

uses an extended data structure representing the arithmetic or logic expression which includes the high-bit values of the expression.

considers the above two properties to apply the value correcting functions to the operands of an operation only when this is required.

These points illustrate that the present method differs from known methods in which the value-correcting functions are always applied to the result of the operation.

For example, we can extend the data structure to include the masking and sign-extension extent of the expression, and from these properties the present method significantly reduces the number of value-correcting functions required during the translation. In the following we simply store the masked and sign-extended property in the data-structure of the expressions, and explain how these two properties are used effectively by the present method to generate efficient target expressions. If we consider the masking and sign-extension extent instead of the masked and sign-extended property, then the method will generate slightly more efficient expressions. For example, the sub-expressions of the following expression:

$$(a_{(US)} \& 3_{(US)}) + 1_{(US)}$$

have the following masking extents:

$$a_{(US)} \& 3_{(US)} 2$$

$$1_{(US)} 1$$

and, by using the property of the +operator that the masking extent of the result is 1 added to the maximum masking extent of its operands, then we deduce that the masking extent of the main expression it 1+2=3. We therefore know that the main expression is masked, and hence faithful. As a result it never needs to be value corrected. If, instead of keeping track of the masking extent, we simply keep track of the masked property, then from the fact that the above two sub-expressions have the masked property, we cannot deduce that the main expression is also masked. This means that the expression may need to be value corrected by adding an additional masking operation.

Given a source expression representation e of width $\omega$, the target expression representation is constructed as follows:

Step 1 A table associating high-bit properties with the variables in the source expression e is constructed.

This table is called the high-bit property mapping and has the form:

| Variable | High-bit properties |
|---|---|
| $U_0$ | $P_0$ |
| $U_0$ | $P_1$ |
| . | . |
| . | . |
| . | . |
| $U_n$ | $P_n$ | where $U_0 \ldots U_n$, are all the variables in the source expression e, and $P_0 \ldots P_n$ are their corresponding high-bit properties which may be one of the followings masked, sign-extended, or none (that is three possible values). The high-bit properties combination where both the masked and the sign-extended properties are set is not allowed in this table. Several data structures can be used for the Internal representation of the high-bit property mapping and appropriate ones include association lists and sorted binary trees if the variables $U_0 \ldots U_n$ can be ordered.

The high-bit property mapping does not affect the correctness of the translation mechanism and, for instance, one can use the trivial mapping which gives no high-bit properties to all variables. However one can develop heuristics which construct a high-bit property mapping depending on how (and how often) the variables are used in the source expressions, so that the target expressions constructed by this translation mechanism can be potentially more efficient.

Step 2 the type information with the following data is constructed:

the same sign as the source expression;

the significant width $\omega$;

the representative width r is chosen to be the smallest native width larger than or equal to $\omega$:

no high-bit properties are set (for the moment).

This type information is denoted by $i_e$. The type information $i_e$ is constructed from the type of e. For example, given a signed 5-bit expression and assuming that the native bit-widths of the target machine are 16, 32, 48, etc., then the type information with the following data is constructed:

| sign: | signed |
|---|---|
| significant width | 5 |
| representative width | 16 |
| high-bit properties | none |

Again, several basic data structures can be used for the internal representation of the above type information. An appropriate one is a record structure with a boolean field for the sign, two integer fields for the significant and representative widths, and two boolean fields for the high-bit properties (one for the masked property and the other for the sign-extended property).

Step 3 The internal representation of the target expression is constructed recursively and the appropriate high-bit properties fields in the type information are set. The base case of this recursive method is when the source expression a is an atomic expression; the recursive case is when the source expression a is a compound expression.

base case: If e is an atomic expression, then a corresponding target atomic expression is constructed.

1. If e is a source constant expression $e_s$, then the target constant expression $<i_t> e_t$, is constructed, where the value of the constant $e_t$ is such that its interpretation is the same as that of $e_s$, and the type information $i_t$ is the type information $i_e$ (which was constructed in step 2 above) with the high-bit properties set according to the value of the unused bits in $e_t$.

Figure 6:
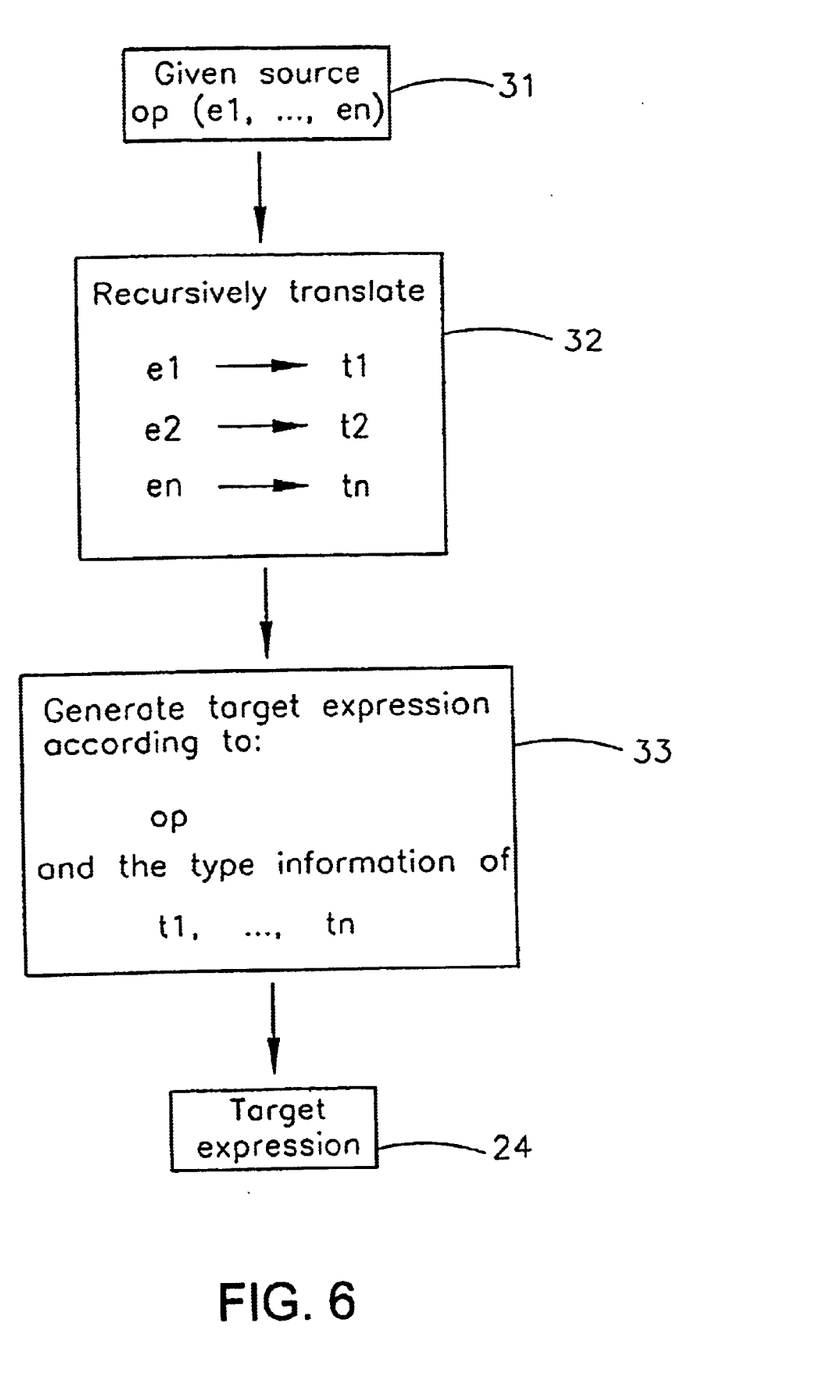
FIG. 6 is a high-level flow diagram illustrating transformation of a compound source expression to a target expression.

2. If e is a source variable expression, then a target variable expression is constructed. A unique target variable identifier is used for every source variable identifier. More formally, the mapping from source variable identifiers into target variable identifiers is a total injective mapping. The high-bit properties fields of the type information $i_s$ constructed in step 2 above are set according to the entry in the high-bit property mapping constructed in step 1. If the high-bit property mapping entry for the source variable is the masked property, then the masked field is set. Similarly, if the entry is the sign-extended property, then the sign-extended field is set. If the entry states that no high-bit properties are assigned to the source variable, then no high-bit properties in the type information $i_e$ are set.

recursion A source compound expression op $(e_1, e_2, \ldots, e_n)$ 31 as shown in FIG. 6 is transformed into a target expression as follows:

1. The source operands $e_1, e_2, \ldots, e_n$ are first translated 32 into target expressions $t_1, t_2, \ldots, t_n$ using this method recursively.

2. The target expression 24 is then constructed using the operations 33 of the target machine such that:

The target sub-expressions used in an arithmetic operation are applied to the masking operation or the sign-extending operation if the values in the unused bits of the operands can affect the values of the significant bits of the result of the operation.

In the case of relational operations which simply compare the value of two or more expression (such as <), then it is usually enough to apply a monotonic operation which uses the value of the significant bit-string only and returns a value which uses all the bits in the target integer value. An efficient example of this is the operation which, given an expression e, returns a <<(r-v), where << is the left-shift operator, and r and w are the representative and significant widths of e.

When different operations (masking, sign-extending, monotonic operations) can be used on the internal representation of the target operands, then the operation which results in the cheapest target expression is chosen.

The type information $i_t$ of the target expression is constructed from the type information $i_s$ (step 2 above) by setting the masked high-bit property when it can be guaranteed that the value of the operation is always masked: and similarly, the sign-extended high-bit property is set when it can be guaranteed that the value of the operation is always sign-extended. This step depends on the second property of the arithmetic operator concerned as described hereinbefore.

Again, there are several data structures which can be used to represent the target expression internally. An appropriate one is a tree structure where the leaf nodes represent atomic expressions and the non-leaf nodes represent operators.

Finally, as shown in FIGS. 3 and 5, the data representing the type information is stripped from the final Internal representation of the target expression.

In the following example, it is assumed that the source and target languages contain constants, variables and compound expressions involving the following operators:

The unary operators: !, ~ and − whose semantics are the same as their respective C unary operators as given in with the typing rule that the type of the operand of these operators should be the same as the type of the value of the operation.

The binary infix operators: +, −, *, /, %, |, ^, &&, ||, ==, !=, <=, >=, <, >, <<, >>, >>,, and =, whose semantics are the same as their respective C binary operators with the exception that for simplicity shifts (<< and >>) by values greater than the bit-width of their first operand are undefined. We also assume the following typing rules:

1. the operands of all the operators with the exception of = =, !=, <=, >=, <, >, <<, >>and, have the same type as that of the value they return;
2. the operands of the relational operators ==, !=, <=, >=, < and >have the same type;
3. the first operands of << and >>have the same type as the value they return; the second operands of << and >>are unsigned;
4. the second operand of , has the same type as the value it returns.

Conditionals of the form:

$e_1 ?e_2:e_3$ whose semantics is the same as C conditional expressions. We assume that the operands e; and e, have the same type as the value returned by the conditional expression.

Typecasts of the form:

(type) $e_1$ where type has the form signed w or unsigned w which gives a new sign (sign or unsigned) and width (w) to the operand $e_1$. The value of this operation is sign-extended automatically if the operand $e_1$ is signed and narrower than w.

Given the above operators, simple masking and sign-extending operations can be implemented as follows:

masking Given an expression $<i_t>t$, if the type information $i_t$ has the masked property, then this operation simply returns $<i_t>t$. Otherwise, if the significant width of the expression is w, and its representative width is r, then we are required to mask the value of the expression with the bit integer whose lowest w bits are 1 and whose highest r-w bits are 0. Let us call this integer m. The type information $i_m$ associated with m has the same sign as $i_t$, the significant width r and the representative width r. The required expression is therefore:

$$<i'_t>(<i_t> \& <i_m>m)$$

where $i'_t$ is the type information resulting from setting the masked property to $i_t$ and unsetting its sign-extended property. Given an expression e, we denote the application of the masking operation by m(e).

sign extending Given an expression $<i_t>t$, if the type information i, has the sign-extended property then this operation simply returns $<i_t>t$. Otherwise if the significant width of the expression is w, and its representative width is r, then we can sign-extend the value of t by left-shifting by r-w places, and then applying an arithmetic right-shift by r-w places. (Note that an arithmetic right-shift preserves the highest bit of its operand.) Let us denote the constant r-w by u. The type information $i_u$ associated with u is unsigned, has the significant width r and the representative width r. If $i_t$ is signed, then the required expression is:

$$<i''_t>((<i'_t>(<i_t>t<< <i_u>u)) >> <i_u>u)$$

where $i'_t$ is the type information $i_t$ made precise by setting the significant field to r, and $i''_t$ is the type information constructed from $i_t$ by setting the sign-extended high-bit property, and unsetting the masked property.

If $i_t$ is unsigned, then the sub-expression:

$$(<i'_t>(<i_t>t << <i_u>U))$$

is type cast by signed r before it is right-shifted (in order to achieve an arithmetic right-shift, rather than a logical one), and the final expression is then type cast by unsigned r to retain its sign.

Given an expression e, we denote the application of the sign-extending operation by m(e).

We recall the definition of f(e) as m(s) if the expression e is unsigned, otherwise as s(e) if e is signed. We also define the following monotonic operation required during the translation of the relational operations involving ==, !=, <, <=, > and >=:

monotonic operation Given an expression $<i_t>t$ with significant width w and representative width r, this operation returns:

$$<i'_t>(<i_{t>i<<<iu>u})$$

where u to r-W, and the type information $i'_t$ has the same sign as $i_t$, the significant width r and representative width r. The type information $i_u$ is unsigned, has the significant width r and representative width r. Given an expression e, we denote the application of this monotonic operation by mn(e).

More efficient implementations of the masking, sign-extending and the above monotonic operations are possible, although the above implementations are sufficient for the correctness of the translation mechanism described herein.

Such more efficient implementations use the technique of applying optimising transformations to improve the efficiency of the expressions. The following are transformations that can be applied on the operations:

A masked operation e of the form t and m an be optimised as follows:

If t is a constant k, then the value of e is calculated to say, 1, and e is replaced by 1.

If t in of the form x & k or k & x where k is a constant, then the value of k and m is calculated to say, 1, and e is replaced by t & 1.

If t Is of the form x & y where either (or both) x & m or y & m can be optimised to say, x' and y', then e is replaced by x' & y'. Similar rules apply for operations of the form x | y, x ~ y, z ? x : Y.

A sign-extended operation e of the form (t<<u)>>u can be optimised as follows:

If t Is a constant k, then the value of e is calculated to say, 1, and e is replaced by 1.

If t is of the form x<<k where k is a constant, then the value of k+u is calculated to say, 1, and e is replaced by (t<<1)>>u.

If t is of the form x & y where either (or both) (x<<u)>>u or (y<<u)>>u can be optimised to say, x' and y', then e is replaced by x' y' Similar rules apply for operations of the form x | y, x ~ y, z ? x : y.

A monotonic operation e of the form t<<u can be optimised as follows:

If t is a constant k, then the value of e is calculated to say, 1, and e is replaced by 1.

If t Is of the form x<<k where k is a constant, then the value of k+u is calculated to say, 1, and e is replaced by t<<1.

If t is of the form x & y where either (or both) x<<u or y<<u can be optimised to say, x' and y', then e is replaced by x' & y'. Similar rules apply for operations of the form x | y, x ~ y, z ? x : y.

We may sometimes require to choose the most efficient expression from a number of expressions. Given a number of expressions $e_1, \ldots, e_n$, we use the term t"the cheapest of $e_1, \ldots, e_n$," to denote the expression in $e_1, \ldots, e_n$ that is likely to be computed most efficiently. We also define this term on pairs of expressions: "the cheapest of $(e_1, e'_1), \ldots, (e_n, e'_n)$" is the pair of expressions in $(e_1, e'_1), \ldots (e_n, e'_n)$ such that the computation of e followed by that of e' is likely to be the most efficient. A good measure of the efficiency of a target expression is the number of operators in its internal representation: the cheapest expression is the one with the least number of operators.

We say that some type information $1_1$ to the type information $i_2$ made faithful if $i_1$ is constructed from $i_2$ by setting the masked high-bit property if $i_2$ is unsigned, and by setting the sign-extended high-bit property if $i_2$ is signed.

We now describe the method for translating source expressions Into target expressions:

Constants and variables in the source language are transformed into target constants and variables as explained earlier.

Given a unary operation e of the form:

op ($e_1$)

we first construct the type information $i_t$ from the type of e ($i_t$ has no high-bit properties), and then transform the operand $e_1$ recursively into $t_1$. The expression $t_1$ is annotated with its typing information since it is represented by the internal representation described hereinbefore. The required target expression:

$$<i'_t>op(t'_1)$$

is then constructed, where if the operator op is:
- !: the expression $t'_1$ needs to be masked or sign-extended since the value of the unused bits of $t_1$ may affect the significant bit-string in the result of the ! operation. Therefore the expressions $m(t_1)$ and $(t_1)$ are constructed and $t'_t$ is chosen to be the cheaper of the two. The type information $i'_t$ is the type information $i_t$ made faithful.
- the required operand $t'_1$ is simply $t_1$ since the unused bits in $t_1$ do not affect the significant bit-string in the result of the ~ operation. The type information $i'_t$ is constructed from $i_t$ by setting the sign-extended property if and only if t, is sign-extended.
- the required operand $t'_1$ is $t_1$ and the type information $i'_t$ is $i_t$ since the value of the arithmetic negation operation—cannot be guaranteed to be always masked and/or sign-extended.

Given a binary operation e of the form:

$$e_1\ op\ e_2$$

we first construct the type information $i_t$ from the type of e, and transform the operands $e_1$ and $e_2$ into $t_1$ and $t_2$, respectively. The required target expression is:

$$<i'_t>(t'_1\ op\ t'_2)$$

where if the operator op is:
- +, −, *: the operands $t'_1$ and $t'_2$ are $t_1$ and $t_2$, respectively. The type information $i'_t$ is $i_t$.
- /, %: the operands $t'_1$ and $t'_2$ are $f(t_1)$ and $f(t_2)$. The type information $i'_t$ is $i_t$ made faithful.
- &&, ||: the operand $t'_1$ is the cheapest of $m(t_1)$, $s(t_2)$; and the operand $t'_2$ is the cheapest of $m(t_2)$, $s(t_2)$. The type information $i'_t$ is $i_t$ made faithful.
- & : the operands $t'_1$ and $t'_2$ are $t_1$ and $t_2$. The type information $i'_t$ is constructed from $i_t$ by setting the masked property if either $t_1$ or $t_2$ masked, and then setting the sign-extended property if both $t_1$ and $t_2$ are sign-extended.
- |, ~ : the operands $t'_1$ and $t'_2$ are $t_1$ and $t_2$. The type information $i'_t$ is constructed from $i_t$ by setting the masked property if both $t_1$ and $t_2$ are masked, and then setting the sign-extended property if both $t_1$ and $t_2$ are sign-extended.
- ==, 1=: the pair of operands $(t'_1, t'_2)$ is the cheapest of $(m(t_1), m(t_2))$, $(s(t_1), s(t_2))$, $(mn(t_1), mn(t_2))$. The type information $i'_t$ is $i_t$ made faithful.
- <=, >=, <, > : the pair of operands $(t'_1, t'_1)$ is the cheapest of $(f(t_1), f(t_2))$, $(mn(t_1), mn(t_2))$. The type information $i_t$ is $i_t$ made faithful.
- << : the first operand $t'_1$ is the expression $t_1$, and the second operand $t'_2$ is $f(t_2)$. The type information $i'_t$ is $i_t$.
- >> : the operands $t'_1$ and $t'_2$ are $f(t_1)$ and $f(t_2)$, respectively. The type information $i'_t$ is $i_t$ made faithful.
- = : the first operand $t'_1$ is simply the expression $t_1$. The second operand $t'_2$ is $m(t_2)$ if $t'_1$ is masked, $s(t_2)$ if $t'_1$ is sign-extended, or otherwise it is $t_2$. The type information $i'_t$ is constructed from se by setting the masked property it $t'_2$ is masked, and then setting the sign-extended property if $t'_2$ is sign-extended.
- , : the operands $t'_1$ and $t'_2$ are $t_1$ and $t_2$. The type information $i'_t$ is constructed from $i_t$ by setting the masked property if $t_2$ is masked, and then setting the sign-extended property if $t_2$ is sign-extended.

Given a conditional expression e of the form:

$$e_1\ ?\ e_2:\ e_3$$

we first construct the type information $i_t$ from the type of e, and then transform the operands $e_1, e_2$ and $e_3$ into $t_1\ t_2$ and $t_3$, respectively. The required target expression is:

$$<i'_t>(t'_1\ ?\ t_2:t_3)$$

where $t'_1$ is the cheapest of $m(t_1)$, $s(t_1)$. The type information $i'_t$ is constructed from $i_t$ by setting the masked property if both $t_2$ and $t_3$ are masked and then setting the sign-extended property if both $t_2$ and $t_3$ are sign-extended.

A type cast expression e of the form:

$$(type_s)\ e_1$$

is transformed into the required target expression as shown below:
1. The type information $i_t$ is constructed from the type $type_s$. Let us define $s_t$ and $r_t$ as the significant width and representative width in $I_t$, respectively. Let us define $type_s$ as the type of the required target expression; that is, $type_t$ has width $r_t$ and the sign of $type_s$.
2. The operand $e_1$ is transformed into the expression $t_1$. Let us define $s_1$ and $r_1$ as the significant width and representative width of $t_1$, respectively.
3. If $s_t$ the same as $s_1$, then the target expression is:

$$<i_t^{(t1)}>(type_t)t_1$$

where $i_t^{(t1)}$ is constructed from $i_t$ by setting the masked property if $t_1$ is masked and then setting the sign-extending property if $t_1$ is sign-extended.
4. If $s_t$ is smaller than $s_1$ then the required target expression is:

$$<i_t>(type_t)t_1$$

5. If $s_t$ is greater than $s_1$ then:
   (a) If $r_t$ is the same as $r_1$ then the target expression is:

$$<i_t^{(f(t1))}>(type_t)f(t_1)$$

The type information $i_t^{(f(t1))}$ is constructed from $i_t$ by setting the masked property if $f(t_1)$ is masked, and then setting the sign-extending property if $f(t_1)$ is sign-extended. This does not make the type information $i_t^{(f(t1))}$ faithful since the sign of $f(t_1)$ may be different from that in $type_t$.
   (b) If $r_t$ is greater than $r_1$ then the target expression is:

$$<i'_t<(type_t)f(t_1)$$

where i' is $i_t$ made faithful

We now illustrate this method by translating the following source expression $$((a_{(US)}+b_{(US)})*c_{(US)})\ /d\ _{(US)}+e_{(US)})$$

into a target expression that can be simulated by a 16 bit architecture.

The given source expression is already type correct.

Step 1: The trivial high-bit property mapping is constructed which associates every variable in the source expression with the "no high-bit properties" entry.

Step 2: The type information data structure is constructed. Since the type of the source expression is unsigned5 and the target architecture is a 16-bit one, the following type information is constructed

| sign: | unsigned |
|---|---|
| significant width: | 5 |
| Representative width: | 16 |
| High-bit properties | none |

Since all sub-expressions in the given source expression have the same type, then the above data is constructed for each sub-expression during the recursive part of this method. In the following we use the notation:

<high-bit properties>expession to denote a given target expression annotated with some particular high-bit properties.

Step 3: The target source expression is constructed recursively as follows:

1. From the source expression s:

$$((a_{(US)}+b_{(US)}b_{(US)})/(d_{(US)}+e_{(US)})$$

the two operands:

$$s_o=((a_{(US)}+b_{(US)})*c_{(US)})$$

$$s_1=(d_{(US)}=e_{(US)})$$

are translated recursively into $t_o$ and $t_1$ as follows:

(a) From the source expression $s_o$, the two operands:

$$s_{00}=a_{(US)}+b_{(US)}$$

$$s_{01}=c_{(US)}$$

are translated recursively into $t_{00}$ and $t_{01}$ as follows:

i. From the source expression $$s_{00}=a_{(US)}$$

$$s_{000}=b_{(US)}$$

are translated recursively into $t_{000}$ and $t_{000}$ by simply constructing a unique target variable for each source variable and thus giving:

$$s_{000}=<none>a_{(US)}$$

$$s_{000}=<none>b_{(US)}$$

The high-bit property mapping constructed in step 2 does not assign any high-bit properties to the above variables, and therefore none are set.

ii. Since the operator concerned in $s_{00}$ is +, then no value correcting operators need to be applied on the two operands $t_{000}$ and $t_{001}$ and therefore the following target expression $t_{00}$ is constructed:

$$t_{00}=<none>a_{(U16)}+b_{(U16)}$$

No high-bit properties can be guaranteed and therefore none are set.

iii. The source expression $s_{01}$ is translated recursively into $t_{01}$ by simply constructing a unique target variable for the source variable and thus giving:

$$t_{01}=<none>c_{(U16)}$$

The high-bit property mapping constructed in step 2 does not assign any high-bit properties to the above variable, and therefore none are set.

(b) Since the operator concerned in $s_0$ is *, then no value correcting operators need to be applied on the two operands $t_{00}$ and $t_{01}$ and therefore the following target expression to it constructed:

$$t_0=<none>((a_{(U16)}+b_{(U16)})*c_{U16})$$

No high-bit properties can be guaranteed and therefore none are set.

(c) From the source expression $s_1$, the two operands:

$$s_{10}=d_{(US)}$$

$$s_{11}=e_{(US)}$$

are translated recursively into $t_{10}$ and $t_{11}$ by simply constructing a unique target variable for each source variable and thus giving:

$$t_{10}=<none>d_{(US)}$$

$$t_{11}=<none>e_{(U16)}$$

The high-bit property mapping constructed in step 2 does not assign any high-bit properties to the above variables, and therefore none are set.

(d) Since the operator concerned in $s_1$ is +, then no value correcting operators need to be applied on the two operands $t_{10}$ and $t_{11}$ and therefore the following target expression $t_{10}$ is constructed:

$$t_1=<none>(d_{(US)}+c_{(US)})$$

No high-bit properties can be guaranteed and therefore none are set.

2. Since the operator concerned in s is /, then the target expressions $t_0$ and $t_1$ are applied to the masking value correcting operation giving:

$$t'_0=<masked>((a_{(U16)}+b_{(U16)})*c_{(U16)})\ \&\ 31_{(U16)}$$

$$t'_1=<masked>(d_{(U16)}+e_{(U16)})\ \&\ 31_{(U16)}$$

and the target expression t=<none>

$$(((a_{(U16)}+b_{(U16)})*c_{(U16)})\ \&\ 31_{(U16)})/$$

$$((d_{(u16)}+e_{(U16)})\ \&\ 31_{(U16)})$$

is constructed. Since the masked property can be guaranteed in the result of the unsigned operation, then the masked high-bit property of is set giving the following final internal representation of t the target expression:

<masked>

$$(((a_{(U16)}+b_{(U16)})*c_{(U16)}) \ \& \ 31_{(U16)})/$$

$$((d_{(u16)}+e_{(U16)}) \ \& \ 31_{(U16)})$$

The last stage is to strip the additional type information from the above expression, thus giving:

$$(((a_{(U16)}+b_{(U16)}) \ *c_{(U16)}) \ \& \ 31_{(U16)})/$$

$$((d_{(u16)}+e_{(U16)}) \ \& \ 31_{(U16)})$$

Figure 7:
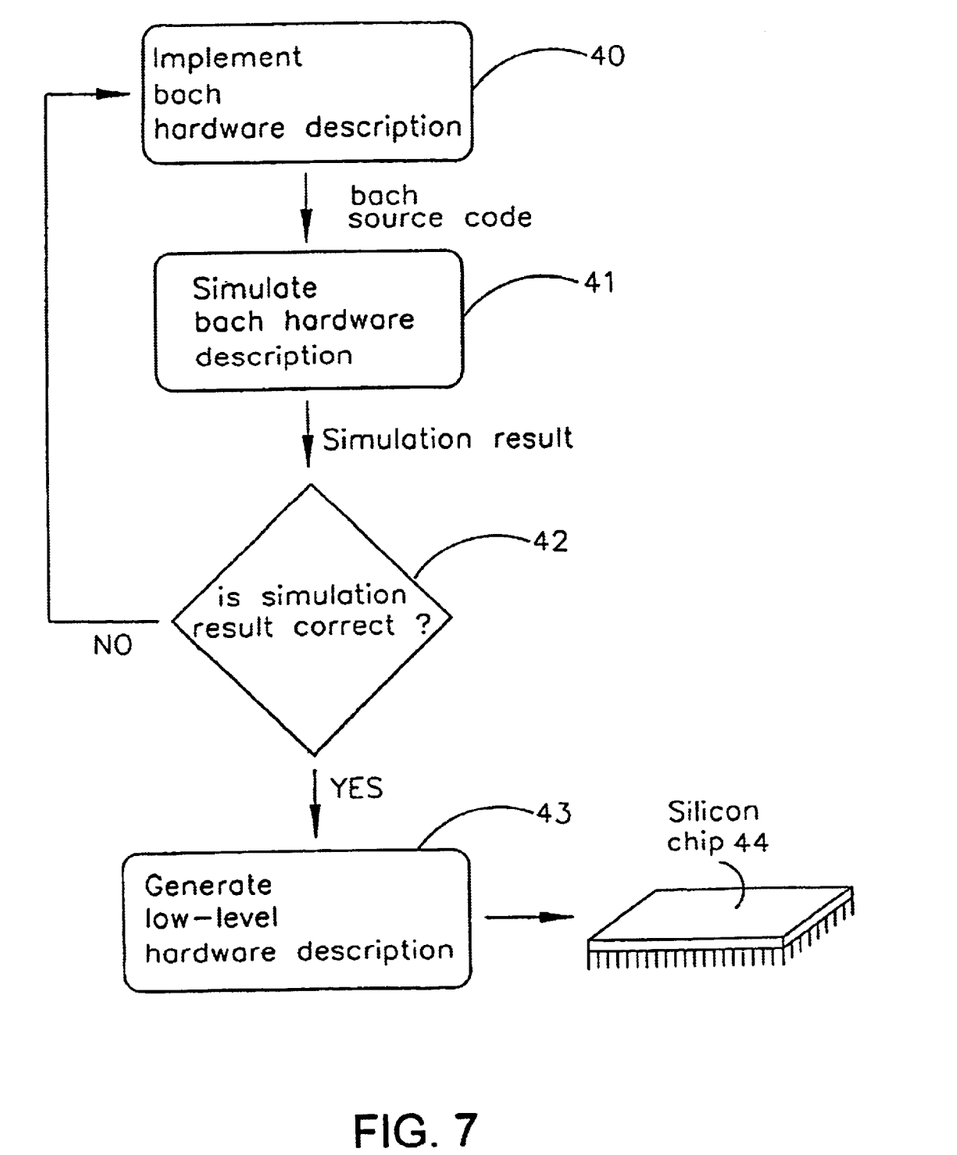
FIG. 7 is a schematic flow diagram illustrating use of the method of FIG. 3 in the design and implementation of hardware in the form of an integrated circuit.

This technique may be used in the efficient simulation of high-level descriptions of arithmetic circuits on a specified target machine. FIG. 7 illustrates an example of a Bach hardware design flow in which hardware is described in the Bach high-level language. The hardware description is implemented at 40 and results in Bach source code. A step 41 simulates the Bach hardware description and makes use of the method described hereinbefore to provide a translation of operations or expressions which are to be implemented in the arithmetic and/or logic circuits of the target machine. The simulation result is checked for correctness at 42. If incorrect, a fresh implementation is performed in the step 40. If the simulation result is correct, a stop 43 generates a low-level hardware description which is then converted using known or appropriate techniques to a silicon chip 44.

What is claimed is:

1. A method of translating a source operation on at least one source operand comprising a binary integer of a first bit-width to a corresponding target operation for evaluation by a processor which performs integer operations on binary integers of a second bit-width which is greater than the first bit-width, the method comprising: translating the source operation to a target operation having at least one target operand; identifying whether the value of unused bits of the or each target operand affects the value of the target operation and whether the target operand or any of the target operands is capable of having one or more unused bits of inappropriate value; and, if so, adding to the target operation a correcting operation for correcting the value of each of the one or more bits of inappropriate value before performing the target operation.

2. A method as claimed in claim 1, wherein the at least one source operand comprises at least one constant.

3. A method as claimed in claim 1, wherein the at least one source operand comprises at least one variable.

4. A method as claimed in claim 1, wherein the at least one source operand comprises at least one sub-operation.

5. A method as claimed in claim 1, wherein the source operation comprises an arithmetic operation.

6. A method as claimed in claim 5, wherein the identifying step comprises identifying an unsigned unmasked target operand and the correcting step comprises a masking step.

7. A method as claimed in claim 6, wherein the first bit-width is w bits and the masking step comprises performing a bit-wise AND operation between the unsigned unmasked target operand and a binary representation of (2w-1).

8. A method as claimed in claims 5, wherein the identifying step comprises identifying a signed non-sign-extended target operand and the correcting step comprises a sign-extending step.

9. A method as claimed in claim 1, wherein the source operation comprises a relational operation and the correcting step comprises a monotonic operation.

10. A computer program for performing a method as claimed in claim 1.

11. A storage medium containing a computer program as claimed in claim 10.

12. A computer programmed by a program as claimed in claim 10.

13. A translation produced by a method as claimed in claim 1.

* * * * *